3,042,543

MAGNETIC PARTICLES AND METHOD OF MAKING SAME

William J. Schuele, Philadelphia, Pa., assignor to The Franklin Institute of the State of Pennsylvania, Philadelphia, Pa., a corporation of Pennsylvania No Drawing. Filed Nov. 7, 1960, Ser. No. 67,462
9 Claims. (Cl. 117—62)

This invention relates to particles of novel composition having valuable magnetic properties and to a method for preparing same, and more particularly to microscopic, acicular particles having a non-magnetic core and a surface film of metallic iron, and to a method by means of which such particles may be produced.

It is known that permanent magnets may be obtained by agglomerating under pressure microscopic particles of a ferromagnetic material, the size of the particles preferably being of the same order of magnitude as that of particles having a size which energy considerations have shown to be essential for particles to be single-domain particles, i.e. particles whose magnetic moments are oriented in a single direction. Such particles have been produced by heating iron oxide particles of the required small size to elevated temperatures in the presence of an atmosphere of a reducing gas, such as hydrogen. Unfortunately, the step of reducing the oxide particles to metallic iron is difficult to control and frequently results in the production of particles not possessing the magnetic properties desired. For example, if the oxide particles have acicular shape, a shape which usually produces improved magnetic properties, during reduction of the oxide, the particles may lose this desirable acicular shape, e.g. they may become spherical, resulting in lower demagnetizing energy. In addition, there is a tendency for the particles to become sintered together into agglomerates during the reduction step, which leads to increased magnetic interaction resulting in lower coercive force.

A primary object of this invention is to provide particles of novel composition having valuable magnetic properties.

Another object of this invention is the provision of microscopic, acicular particles having a non-magnetic core and a surface film of metallic iron, which particles have high coercive force and excellent resistance to demagnetization.

A further object of this invention is to provide a process by means of which these novel microscopic, acicular particles can be produced in a relatively simple and inexpensive manner.

Still another object of this invention is the provision of a method for making elongate, substantially single-domain size particles having valuable magnetic properties, which process overcomes the problems of loss of elongation and formation of unwanted agglomerates.

These and other objects of this invention will become readily apparent from a further consideration of this specification and appended claims.

According to this invention there are provided microscopic, acicular particles of improved magnetic properties comprising an acicular core of a material capable of receiving a colloidal charge in aqueous medium and of retaining acicular shape when heated to temperatures of the order of about 300° C. selected from the group consisting of inorganic silicates and non-magnetic metal oxides and a surface film comprising metallic iron. The core particles should have a length in the range between 500 A. and about 5 microns, a transverse dimension in the range between about 30 A. and about 0.1 micron; a ratio of length to transverse dimension of from about 15:1 to about 150:1, and a surface area of from about 100 to about 350 m.$^2$/g. The thickness of the metallic iron film should be from about 50 to about 150 A.

According to this invention there is also provided a method for producing such microscopic, acicular particles of improved magnetic properties which comprises forming an aqueous dispersion of negatively charged acicular core particles, precipitating on the core particles positively charged ferric oxide sol particles, preferably having a particle size insufficiently large for resolution in an electron microscope, so as to provide the core particles with a surface film of ferric oxide. The resulting particles are separated from the aqueous medium and heated to an elevated temperature in an atmosphere of a reducing gas to convert the surface film of ferric oxide to metallic iron.

As pointed out previously, good permanent magnets can be made from single-domain elongated particles. However, such particles are extremely difficult to prepare and form into magnets without loss of elongation or acicular shape, resulting in particles having lower demagnetizing energy. Furthermore, undesirable sintering together of the particles is extremely difficult to prevent and leads to increased magnetic interaction between particles, causing a lower coercive force.

According to this invention these difficulties are overcome, for the novel acicular particles are highly resistant to loss of elongation, not only during preparation but in fabrication of magnets. The core material of a silicate or a non-magnetic oxide is extremely stable at those temperatures ordinarily encountered in making the novel particles and in fabricating magnets therefrom. The essentially cylindrical film of metallic iron deposited on the non-magnetic core exhibits a large coercive force. Even though the non-magnetic core is not entirely coated with metallic iron, but merely has deposited thereon an incomplete film of iron, the core material advantageously reduces the magnetic interaction between particles to provide for magnets of enhanced magnetic properties.

The core material of the novel particles of this invention may comprise a silicate or a non-magnetic metal oxide. The core material should be capable of receiving a colloidal charge in aqueous medium so as to prevent flocculation of the core particles. Also, the core material should be capable of being heated at least to about 300° C. without undergoing any physical or chemical change which would result in a change of shape, i.e. loss of elongation.

The core material may be selected from two particular classes of material, namely silicates and non-magnetic metal oxides having the above described properties.

The silicates may comprise clays, such as Attapulgus and hectorite clays, and synthetic silicates such as glass fibers of extremely fine diameter.

A preferred core material is activated Attapulgus clay, a hydrous magnesium aluminum silicate. This material comprises extremely small needle-like crystals having an average length of about 0.2 to 1.5$\mu$, an average transverse dimension of about .01 to .05$\mu$ and an average length to transverse dimension ratio of about 20:1 to 30:1. A typical chemical analysis of such an Attapulgus clay product on a volatile free basis is as follows:

TABLE I

| Constituent: | Weight percent |
|---|---|
| Silicon ($SiO_2$) | 67.0 |
| Aluminum ($Al_2O_3$) | 12.5 |
| Magnesium (MgO) | 11.0 |
| Iron ($Fe_2O_3$) | 4.0 |
| Calcium (CaO) | 2.5 |
| Other | 3.0 |

The specific gravity of this activated Attapulgus clay is in the range between about 2.3 and 2.5.

In attapulgite clay, long double chains of $Si_4O_{11}$ composition run parallel to the fiber axis. These chains are joined together by magnesium and calcium ions as well as through shared oxygen atoms. A complete planar sheet of oxygen atoms is thus produced, arranged exactly as in the micas, the silicon atoms forming long strips alternately on the two sides of the oxygen sheet. The magnesium-aluminum-oxygen units also are placed in strips parallel to the fiber axis. Channels, of a free cross section of 3.7 to 6.0 A., large enough to admit molecules of considerable size, run parallel to the fiber axis, having no interconnections of comparable size. In the natural clay, loosely held water molecules occupy a considerable part of this space. On dehydration at moderate temperatures these water molecules are removed, but the structure remains essentially intact.

Activation of Attapulgite clay is effected by heating the natural clay at controlled temperatures generally not exceeding about 120°–150° C., to drive off these loosely held water molecules. The clay may also be activated by an extrusion process which consists of forcing the clay in plastic condition through a die, which disrupts the original orientation of bundles of needle-like crystals into a less oriented arrangement in which the individual needle-like crystals are separated from one another.

Activated Attapulgus clay has moderate base exchange capacity ranging from about 18 to about 28 meg. per 100 grams.

Commercial forms of activated Attapulgus clay suitable for use as core material according to this invention comprise Attagel 20 and Attagel 30, produced and sold by Minerals and Chemicals Corporation of America, Menlo Park, New Jersey.

Another preferred core material comprises a beneficiated hectorite which is a magnesium lithium silicate. Hectorite has the following approximate analysis:

TABLE II

| Constituent: | Weight percent |
|---|---|
| Silicon ($SiO_2$) | 56.0 |
| Magnesium (MgO) | 25.0 |
| Sodium ($N_2O$) | 3.0 |
| Lithium ($Li_2O$) | 1.0 |
| Fluorine | 6.0 |
| $H_2O$ removed at 150° C. | 10.0 |
| $H_2O$ removed at high temperatures | 2.0 |
| Other | 7.0 |

Beneficiated hectorite may be produced by grinding the raw hectorite ore to a coarse powder which is then slurried with heated deionized water to form a thin gel from which impurities such as calcite, dolomite and silica crystals are separated, as for example by centrifugation. The resulting slurry is then dried and ground to form thin, readily water-dispersable elongated particles having dimensions within the above stated ranges for core particles.

Beneficiated hectorite advantageously has exchangeable sodium ions which provide the material with an ion exchange capacity of 100 meg. per 100 grams. This ion exchange capacity enhances precipitation of ferric oxide particles on the surface of the hectorite core particles, as described more fully hereinafter.

A commercial form of beneficiated hectorite which advantageously may be employed in carrying out this invention is Macaloid produced and sold by The Inerto Company, San Francisco, California.

The core material may comprise clay minerals other than attapulgite and hectorite and may comprise any clay having a fibrous type chain structure. These clay minerals generally fall into the palygorskite group of clay minerals, which includes in addition to attapulgite (a form of palygorskite), palygorskite, which term also includes Floridin, sepiolite and garnierite. In order to increase the water dispersibility of these clays, activation treatment, as described above, may be employed.

The elongate core particles, in addition to the clay minerals described above, may comprise synthetic silicates. Such synthetic silicates may comprise various glass compositions, which in fluid form may be extruded through extremely fine dies to form fibers having a diameter not exceeding about 0.1 micron. These fibers may be subjected to milling, as for example in a ball mill, to provide elongate particles of glass having a length not exceeding about 5 microns. Glass fiber particles so formed can be given a colloidal charge in aqueous medium.

The composition of such glassy silicates should be such as to have a softening point above about 300° C. so as to insure that the particles formed thereof do not lose their elongate or acicular shape in formation of the magnetic particles of this invention.

In addition to silicates, both natural and synthetic, the core material may comprise a non-magnetic metal oxide, such as alumina which may be produced in the form of extremely fine elongate particles having the particle dimensions and physical properties hereinbefore specified.

For example alumina particles may be prepared according to the method of United States Patent No. 2,915,475. According to the method of that patent there is produced fibrous alumina in the form of fibrils having an average length in the range from 1000 A. to 7000 A., the remaining average dimensions being in the range from 30 to 100 A. The axial ratio of the fibuls (length to diameter or width) is from 50:1 to 150:1. These fibrils also have a surface area of 250 to 350 $m.^2/g$.

The elongate or acicular particles of core material should be extremely small, preferably being in the single-domain particle size range. The particles may have a length of from about 500 A. to about 5 microns, a transverse dimension (width or diameter) of from about 30 A. to about 0.1 micron, and length to transverse dimension ratio of from about 15:1 to about 150:1. Preferably the core particles have a length in the range between about 1000 and 10,000 A., a transverse dimension in the range between about 50 and about 200 A., and a length to transverse dimension ratio of about 20:1 to 30:1.

It is desirable to keep the specific gravity of the core material as low as possible in order to reduce the weight contributed by the core. Accordingly the core material preferably has a specific gravity of from about 0.5 to 3. Activated Attapulgus clay has a specific gravity of from about 2.3 to about 2.5.

As stated above the base particles are of such size and composition as to be able of accepting a colloidal charge in aqueous medium. This is necessary in order to prevent the core particles from flocculating, and to enable the extremely fine ferric oxide particles to be precipitated on the surface of the core particles to provide them with an iron oxide surface film.

Providing the core particles with a colloidal charge, generally a negative charge, is accomplished by inclusion in the aqueous dispersing medium of certain inorganic and organic surface active agents which act as dispersing or suspending agents for the particles. These agents in ionized form are adsorbed by the core particles. The absorbed ions produce an electrostatic charge on the core particles, which when it is large enough, causes the particles to repel one another.

Suitable inorganic surface active agents which function as described in the preceding paragraph are sodium chloride, sodium sulfate, sodium silicate, and various alkali metal phosphates and polyphosphates, such as sodium orthophosphate, tetrasodium pyrophosphate, sodium hypophosphate and sodium hexametaphosphate. Preferred inorganic dispersing or suspending agents are those providing the particles with a large negative charge such as sodium pyrophosphate which has the $P_2O_7^{\equiv}$ radical.

Organic suspending or dispersing agents are also anionic, and include alkali metal salts of carboxylated polyelectrolytes and alkali metal salts of condensed sulfonic acids, particularly the sodium salts.

In producing the novel magnetic particles according to this invention, the particles of core material are suspended in aqueous medium with the aid of the above-discussed suspending agents. Best results are obtained by using high shear equipment in making the suspension. In the laboratory, a Waring blendor is a convenient high shear unit. For commercial plant use, a high shear unit such as a close clearance colloid mill, homogenizing mill or high shear agitating mill may be used. Recirculation through a pump with throttled discharge has also proven effective for plant use.

In forming such suspensions, ordinarily sufficient solid particles are used to provide a suspension comprising from about 1 to about 10% by weight of solid particles. Preferably the aqueous suspension will comprise from about 3 to about 6% by weight of solids. The suspension should not have so large a solids content as to form a gel, and although a solids concentration somewhat greater than 10% can be used, there is ordinarily no advantage to be gained thereby for coating of the particles with ferric oxide takes too great a time.

Preferably the solid particles of core material are added to distilled water to which the suspending agent has been added. The amount of suspending agent required will depend upon the effectiveness of the agent, lesser amounts being required for agents producing the greater charge. Ordinarily with highly negatively charged suspending agents, such as sodium hexametaphosphate, about 0.02 g. of suspending agent per gram of clay is sufficient. A skilled chemist will have no difficulty in forming a stable suspension employing a particular core material and a particular suspending agent.

As stated above, iron oxide particles of extremely small size are precipitated on the dispersed core particles so as to provide the core particles with a film or coating of iron oxide. The size of the iron oxide particles is preferably so small as to be incapable of resolution by means of an electron microscope.

The iron oxide particles may first be formed, dispersed in aqueous medium, and the dispersion of these positively charged particles combined with the dispersion of negatively charged core particles, whereby precipitation of the ferric oxide particles on the core particles takes place. Rather than first forming the dispersion of ferric oxide particles, followed by combining the dispersion with the core particle dispersion, the ferric oxide particles may be formed in the aqueous dispersion of core particles. These two methods may be combined. For example, the respective dispersions of iron oxide particles and core particles may be combined, and thereafter additional iron oxide may be precipitated on the core particles as formed. In each instance, the ferric oxide particles can be prepared in the same manner.

One manner for forming these extremely minute ferric oxide particles is described in British patent specification No. 665,554, complete specification published: January 23, 1952. According to this patent specification, such ferric oxide particles can be produced by mixing together, while agitating, an aqueous solution of copperas as $FeSO_4 \cdot 7H_2O$, and an aqueous sodium hydroxide solution. Agitation of the combined solutions should take place over many hours, e.g. 10–20 hours, the agitation being such as to expose a new surface of the mixture to the atmosphere. The reaction which takes place to yield a greenish-yellow mass may probably be expressed as follows:

$$4FeSO_4 \cdot 7H_2O + O_2 + 8NaOH \rightarrow 2Fe_2O_3 \cdot H_2O + 4Na_2SO_4 + 30H_2O \quad (I)$$

When a dispersion of iron oxide hydrate particles thus produced is combined with a dispersion of the core particles, the iron oxide particles are precipitated upon the surface of core particles. If desired, the iron oxide hydrate may be prepared as above in the presence of the dispersed core particles. Also, the iron oxide hydrate may be prepared as above in the presence of core particles upon the surface of which iron oxide hydrate already has been precipitated by combining dispersions of the core and iron oxide hydrate particles.

Another method for forming these extremely small ferric oxide particles involves adding ammonium hydroxide to a ferric chloride solution to form a rich, red sol, and dialyzing the sol until the quantity of free chlorine ($Cl^-$) and ferric iron ($Fe^{+++}$) ions present is negligible. Such a sol may first be produced and then added to the dispersion of core particles or formed in the presence of the core particles, precipitation of the iron oxide particles on the core particles taking place immediately upon formation of the former.

A third and preferred manner of forming the iron oxide particles comprises bubbling air through a solution of a ferrous salt, such as ferrous sulfate. Iron oxide hydrate particles are thus produced according to the following equation:

$$2FeSO_4 + 3H_2O + \tfrac{1}{2}O_2 \rightarrow Fe_2O_3 \cdot H_2O + 2H_2SO_4 \quad (II)$$

Particle growth may be caused by adding free metal to the solution. The sulfuric acid produced according to Equation II attacks the iron metal to form ferrous sulfate, thus supplying this reactant. The size of the iron oxide hydrate produced depends upon temperature, air flow, concentration of reagents, and reaction time. In this process the core particles may have a partial film of iron oxide particles produced by combining a dispersion of core particles with a dispersion of iron oxide particles produced by any of the above-described methods.

Proper growth of the surface film of iron oxide can be obtained when the iron oxide particles are formed in the presence of the core material by permitting the iron oxide formation reaction to take place under controlled conditions over a period of hours. When using the process involving the reaction of Equation II, good film formation can be obtained in about 8 hours when the temperature of the dispersion of core particles is maintained at about 60° C. This time can be reduced to about 4 hours by increasing the temperature to about 80° C. Thus, with this particular reaction, time of reaction is dependent upon temperature, the time decreasing with increasing temperatures.

When an already formed dispersion of iron oxide particles is added to the dispersion of core particles, this also should be carried out over a substantial period of time with good agitation, as for example in high shear equipment described previously.

Regardless of the method employed for iron oxide film formation, sufficient iron oxide must be present to obtain the desired film. The amount of iron oxide will vary with the quantity of core particles and their surface area. Ordinarily, there should be available from about 5 to about 20 g. of ferric oxide per gram of core material. If the surface area of the particles is very great, e.g. 350 m.²g. the amount of iron oxide required will be at the upper portion of this range, e.g. 18–20 g. On the other hand, where the particles have a lesser surface area, such as 125 m.²/g., on the order of 5 to 6 grams of iron oxide per gram of core material ordinarily will be sufficient for proper film formation.

Formation of the surface film can readily be determined by taking samples of the particles from time to time during precipitation of the surface film of iron oxide. The sample particles can be studied under an electron microscope, and an X-ray diffraction pattern for the particles also can be obtained. Preferably film formation is carried out until the core particles have an oxide surface film of about 50 to 150 A. in thickness.

When formation of the oxide film has been completed, the particles are separated from the aqueous medium and dried. The particles may be separated from the aqueous medium in any suitable manner, as for example by filtration or centrifugation. Washing of the particles with distilled water after separation from the aqueous dispersing medium is desirable to effect removal of impurities, such as salts, from the particles. The particles may be air dried by heating to a temperature preferably not exceeding about 105° C. Drying can also be effected by the use of water miscible organic solvents, such as acetone and methanol.

The particles obtained as described above, having a non-magnetic core and a surface film of iron oxide, are subjected to a reducing atmosphere in order to convert the iron oxide film to metallic iron.

In carrying out this reduction of the iron oxide surface film, reaction temperatures not greatly exceeding about 300° C. may be used. Since the rate of reduction is quite slow below about 125° C., temperatures within the range between about 125° C. and 300° C. advantageously may be employed. Preferably, the reduction is conducted at a temperature between about 180° and 200° C.

Somewhat reduced pressures are desirable for use during reduction, and preferably the pressure of the reducing gas, particularly in the initial stages of reduction, does not exceed about 100 mm. of Hg. The reaction may proceed too rapidly and even in an uncontrolled manner if substantially greater pressures are used. Preferably a pressure not exceeding about 50 mm. of Hg is employed, at least during the initial stages of reduction to provide for greater control of the reduction reaction.

In reducing the surface film to metallic iron, the reducing gas may be any reducing gas which will perform the function of reducing iron oxide to metallic iron. Examples of such reducing gases are hydrogen, carbon monoxide, water-gas, and the like. The preferred reducing gas is hydrogen. When hydrogen is employed as the reducing gas one mol of water is produced for each mol of iron oxide reduced according to Equation III below.

$$Fe_2O_3+3H_2 \leftrightarrows 2Fe+3H_2O \qquad \text{(III)}$$

In order to remove this water which tends to react with the iron to form iron oxide, preheated hydrogen gas may be passed through a bed of the particles. The hydrogen gas reduces the oxide film and carries away the water vapor from the bed of material as it is formed. The provision of a deliquescent material in the bed of particles may also aid in water removal.

According to a preferred embodiment of this invention, hydrogen gas is provided, at least in part, and preferably entirely, by means of a metal hydride, as for example a hydride selected from the group consisting of alkali metal and alkaline earth metal hydrides. Suitable alkali metal hydrides include sodium and potassium hydride. The preferred hydride is calcium hydride, which reacts with water to form hydrogen gas and calcium oxide according to Equation IV:

$$CaH_2+H_2O \rightarrow CaO+2H_2 \qquad \text{(IV)}$$

By mixing calcium hydride with the particles having a film of iron oxide, the reaction begins almost immediately, since generally there is a minute amount of water present with the particles which aids in initiating the reaction. It is evident from Equations III and IV, that once the reaction between calcium hydride and water is begun it continues until either all of the iron oxide film or all of the calcium hydride has been consumed, since the hydrogen formed by the reaction between the calcium hydride and water further reacts with the iron oxide surface film on the particles to produce additional water which in turn reacts with calcium hydride to produce the required hydrogen.

The reduced hydrogen pressures referred to previously can be obtained by conducting the reduction under ordinary pressures, but under a partial pressure of hydrogen or other reducing gas, the remainder of the pressure being attributable to an inert gas. Of course, reduction can be carried out in the presence of hydrogen with a substantial absence of other gases if the pressure in the reaction zone is reduced to provide a hydrogen pressure below about 100 mm. of Hg, until a substantial proportion of the oxide film has been converted to metallic iron.

Because the iron film on the particles obtained in the above-described manner is readily oxidized upon being exposed to atmospheric oxygen, at the completion of the reduction step, the particles are permitted to cool either under a vacuum or in the presence of an inert gas, for example nitrogen, and the particles are then covered with benzene, or other organic solvent which does not react chemically with metallic iron, in order to exclude air from contact with the surface of the particles.

The particles having a metallic iron surface can be separated from any unreacted calcium hydride and calcium oxide produced during reduction, as for example by means of a magnetic field.

Because of the excellent magnetic properties of the microscopic acicular particles of this invention, they are particularly suitable for the manufacture of permanent magnets of high quality through agglomeration and magnetization.

The agglomeration of the particles with a view to the manufacture of magnets can take place with or without the use of a binding agent, but must be effected at a temperature which is sufficiently low in order to prevent, as far as possible, any sintering together of the particles. The pressure employed must be sufficiently high to provide the agglomerated body with satisfactory mechanical characteristics, yet must not be too high since otherwise the coercive force obtained by the agglomerated body would be too small. In one procedure, a powder composed of the particles of this invention may be thoroughly mixed with an organic resin binder, such as an epoxy or phenolic resin, and the powder and resin binder pressed in a die under a pressure of from about 500 p.s.i. to about 5000 p.s.i. The resulting body may be lacquered for mechanical strength and permanently magnetized by an electro magnet. Prior to the application of pressure, it may be desirable to place the particles and resin binder in a magnetic field to align the particles, thereby essentially making the moments of the majority of the particles point in the same direction. Also, it may be desirable to mix the particles with a non-magnetic filler, such as sand, which, in addition to the core material of the particles, aids in separating the metallic iron surface films of the particles, thereby reducing interaction effects.

The following examples further illustrate the advantages of this invention, but are not intended to limit the scope of this invention.

*Example I*

40 g. of needle-like particles of attapulgite clay (Attagel 30) having an average length of 0.7 micron and an average diameter of 0.05 micron was suspended in a liter of distilled water by slowly adding the clay particles to the water, which contained 0.3 g. of sodium hexametaphosphate. The dispersion was agitated for 15 minutes in a Waring Blendor.

0.6 mol of $FeCl_2 \cdot 4H_2O$ was dissolved in 1 liter of water and added to the clay suspension. Iron slugs ½" in diameter were wrapped in cheese cloth and inserted into the dispersion.

The aqueous mixture was heated to a temperature of about 80° C. and a vigorous stream of air was bubbled through the mixture. This was accomplished by using a glass tube ring having holes spaced around the upper surface of the ring.

After about 10 hours the process was stopped, the iron slugs removed, and the dispersion placed in a magnetic field to remove any fragments of iron which may be present. The resulting clay particles having a surface film of iron oxide were separated from the liquid medium by filtration and were washed with distilled water to remove any salts. The particles were then dried by heating to about 100° C.

The dried particles were mixed with an equal volume of calcium hydride (400 mesh) and the mixture was placed in a vacuum system containing a pressure regulator which was set to control the pressure over the mixture at 60 mm. of Hg. The particles were heated by means of a cylindrical furnace to 250° C. to effect reduction of the particle surface film of iron oxide. The excess hydrogen produced (above the pressure of 60 mm. of Hg) was continuously pumped away. The reduction was carried out over a period of 16 hours.

The particles comprising a clay core and metallic iron film thereby produced were permitted to cool in the vacuum system and after cooling were wet with benzene in order to exclude atmospheric air from the surface of the particles.

To obtain magnetic measurements of the particles, a sample of the particles still protected with benzene was introduced into molten paraffin at a temperature sufficiently high to volatilize the benzene. Excess paraffin was removed by holding the mixture in a magnetic field and pouring off the excess paraffin.

The sample was then packed into small cylindrical tubes of glass and magnetic properties were obtained by means of a hysteresis looped tracer for D.C. fields.

The particles at a temperature of 300° K. had a coercive force of 980 oersteds and a ratio of remanence to saturation of 0.36.

Similar measurements were made at 78° K. by immersing the sample in liquid nitrogen. At this temperature the particles had a coercive force of 1220 oersteds and a ratio of remanence to saturation of 0.37.

*Example II*

30 g. of needle-like particles of attapulgite clay (Attagel 30) having an average length of about 0.7 micron and an average diameter of about 0.05 micron was added to 500 ml. of distilled water containing 0.3 g. of sodium hexametaphosphate and stirred for 15 minutes by means of a Waring Blendor. The resulting suspension was thereafter diluted with 1 liter of distilled water.

10 g. of sodium hydroxide was dissolved in distilled water (ca 200 ml.) and mixed with the clay suspension with stirring.

12 g. of $FeSO_4 \cdot 7H_2O$ was dissolved in 200 ml. of distilled water and then added to the alkaline clay dispersion, and the mixture was stirred for 3 hours during which time air was bubbled through the mixture.

The clay particles having a surface film of iron oxide was separated from the liquid medium by filtration, washed with distilled water, and dried.

The particles thus obtained were added to a solution of 70 g. of $FeSO_4 \cdot 7H_2O$ in 2 liters of distilled water and the mixture stirred with a Waring Blendor. The temperature of the mixture was raised to 60° C. and air was bubbled through the agitated mixture for 18 hours. Iron carbonyl was added to the mixture as the iron source.

The resulting clay particles having a surface film of iron oxide were separated from the liquid medium by filtration, washed with distilled water to remove any salts, and dried by heating to about 100° C.

The dried particles were mixed with an equal volume of calcium hydride (400 mesh) and the mixture was placed in a vacuum system containing a pressure regulator which was set to control the pressure over the mixture at 60 mm. of Hg. The particles were heated by means of a cylindrical furnace to 250° C. to effect reduction of the particle surface film of iron oxide. The excess hydrogen produced (above the pressure of 60 mm. of Hg) was continuously pumped away. The reduction was carried out over a period of 16 hours.

The particles comprising a clay core and metallic iron film thereby produced were permitted to cool in the vacuum system and after cooling were wet with benzene in order to exclude atmospheric air from the surface of the particles.

To obtain magnetic measurements of the particles, a sample of the particles still protected with benzene was introduced into molten paraffin at a temperature sufficiently high to volatilize the benzene. Excess paraffin was removed by holding the mixture in a magnetic field and pouring off the excess paraffin.

The sample was then packed into small cylindrical tubes of glass and magnetic properties were obtained by means of a hysteresis looped tracer for D.C. fields.

The particles at a temperature of 300° K. have a coercive force of 1020 oersteds and a ratio of remanence to saturation of .417.

Similar measurements were made at 78° K. by immersing the sample in liquid nitrogen. At this temperature the particles have a coercive force of 1260 oersteds and a ratio of remanence to saturation of 0.45.

*Example III*

30 g. of needle-like particles of attapulgite clay (Attagel 30) having an average length of about 0.7 micron and an average diameter of about 0.05 micron was added to 500 ml. of distilled water containing 0.3 g. of sodium hexametaphosphate and stirred for 15 minutes by means of a Waring Blendor.

4 mols of $FeCl_3 \cdot 6H_2O$ were dissolved in 400 ml. of distilled water and 750 ml. of a 14.8 N ammonium hydroxide solution were added drop-wise from a burette to the ferric chloride solution over a period of about three and one half hours. The resulting sol was placed in dialyzing tubing and tubing was placed in distilled water. The distilled water was continuously changed until there were substantially no chlorine ions present as determined by a silver nitrate test.

100 ml. of the sol containing 0.25 g. Fe/ml. was added to the clay suspension. The resulting mixture was added to one liter of distilled water containing 0.6 mol $FeCl_2$ and a small amount of powdered iron carbonyl. This suspension was heated to 60° C. and air was passed through the suspension for a period of 4 hours.

The clay particles having a surface film of iron oxide were separated from the liquid medium by filtration, washed with distilled water, and dried.

The dried particles were mixed with an equal volume of calcium hydride (400 mesh) and the mixture was placed in a vacuum system containing a pressure regulator which was set to control the pressure over the mixture at 60 mm. of Hg. The particles were heated by means of a cylindrical furnace to 250° C. to effect reduction of the particle surface film of iron oxide. The excess hydrogen produced (above the pressure of 60 mm. of Hg) was continuously pumped away. The reduction was carried out over a period of 16 hours.

The particles comprising a clay core and metallic iron film thereby produced were permitted to cool in the vacuum system and after cooling were wet with benzene in order to exclude atmospheric air from the surface of the particles.

To obtain magnetic measurements of the particles, a sample of the particles still protected with benzene was introduced into molten paraffin at a temperature sufficiently high to volatilize the benzene. Excess paraffin was removed by holding the mixture in a magnetic field and pouring off the excess paraffin.

The sample was then packed into small cylindrical tubes of glass and magnetic properties were obtained by means of a hysteresis looped tracer for D.C. fields.

The particles at a temperature of 300° K. have a coercive force of 950 oersteds and a ratio of remanence to saturation of 0.43.

Similar measurements were made at 78° K. by immersing the same in liquid nitrogen. At this temperature the particles have a coercive force of 1180 oersteds and a ratio of remanence to saturation of 0.45.

*Example IV*

30 g. of needle-like particles of attapulgite clay (Attagel 30) having an everage length of about 0.7 micron and an average diameter of about 0.05 micron was added to 500 ml. of distilled water containing 0.3 g. of sodium hexametaphosphate and stirred for 15 minutes by means of a Waring Blendor. The resulting clay suspension was then heated to boiling and a solution containing 40 g. of $FeCl_3 \cdot 6H_2O$ in 250 ml. of distilled water was added slowly while the suspension was vigorously agitated. This suspension was then permitted to stand without further heating and the supernatant liquid was poured off.

The solid particulate product was redispersed in 2000 ml. of distilled water and sufficient $FeSO_4 \cdot 7H_2O$ was added to form an 0.3 molar solution of the sulfate. Iron carbonyl was added to the suspension, the temperature was raised to about 50–55° C., and the suspension was maintained at this temperature for a period of 10 hours at which time air was bubbled therethrough.

The clay particles having a surface film of iron oxide were separated from the liquid medium by filtration, washed with distilled water, and dried.

The dried particles were mixed with an equal volume of calcium hydride (400 mesh) and the mixture was placed in a vacuum system containing a pressure regulator which was set to control the pressure over the mixture at 60 mm. of Hg. The particles were heated by means of a cylindrical furnace to 250° C. to effect reduction of the particle surface film of iron oxide. The excess hydrogen produced (above the pressure of 60 mm. of Hg) was continuously pumped away. The reduction was carried out over a period of 16 hours.

The particles comprising a clay core and metallic iron film thereby produced were permitted to cool in the vacuum system and after cooling were wet with benzene in order to exclude atmospheric air from the surface of the particles.

To obtain magnetic measurements of the particles, a sample of the particles still protected with benzene was introduced into molten paraffin at a temperature sufficiently high to volatilize the benzene. Excess paraffin was removed by holding the mixture in a magnetic field and pouring off the excess paraffin.

The sample was then packed into small cylindrical tubes of glass and magnetic properties were obtained by means of a hysteresis looped tracer for D.C. fields.

The particles at a temperature of 300° K. have a coercive force of 1450 oersteds and a ratio of remanence to saturation of 0.45.

Similar measurements were made at 78° K. by immersing the sample into liquid nitrogen. At this temperature the particles have a coercive force of 1850 oersteds and a ratio of remanence to saturation of 0.55.

What is claimed is:

1. A microscopic, acicular particle of improved magnetic properties comprising an acicular core of a material capable of receiving a colloidal charge in aqueous medium and of retaining acicular shape when heated to temperatures of the order of about 300° C. selected from the group consisting of inorganic silicates and non-magnetic oxides, having a length in the range between about 500 A. and about 5 microns, a transverse dimension in the range between about 30 A. and about 0.1 micron, a ratio of length to transverse dimension of from about 15:1 to about 150:1, and a surface area of from about 100 to about 350 m.²/g., and having a surface film comprising metallic iron of from about 50 to about 150 A. in thickness.

2. A microscopic, acicular particle according to claim 1 in which said core material comprises beneficiated hectorite.

3. A microscopic, acicular particle according to claim 1 in which said core material comprises activated Attapulgus clay.

4. A microscopic, acicular particle of improved magnetic properties comprising an acicular core of a material capable of receiving a colloidal charge in aqueous medium and of retaining acicular shape when heated to temperatures of the order of about 300° C. selected from the group consisting of inorganic silicates and non-magnetic metal oxides, having a length in the range between about 1000 and 10,000 A., a transverse dimension in the range between about 50 and 200 A., a ratio of length to transverse dimension in the range between about 20:1 and about 30:1, and a surface area of from about 100 to about 350 m.²/g., and having a surface film comprising metallic iron of from about 50 and about 150 A. in thickness.

5. A microscopic, acicular particle according to claim 4 in which said core material comprises beneficiated hectorite.

6. A microscopic, acicular particle according to claim 4 in which said core material comprises activated Attapulgus clay.

7. A method for producing microscopic acicular particles having a core of non-magnetic material and a surface film of metallic iron which comprises forming an aqueous dispersion of negatively charged acicular core particles of a material capable of being heated to a temperature of the order of 300° C. without loss of acicular shape selected from the group consisting of silicates and non-magnetic metal oxides, having a length in the range between about 500 A. and about 5 microns, a transverse dimension in the range between about 30 A. and 0.1 micron, a ratio of length to transverse dimension of from about 15:1 to about 150:1, and a surface area of from about 100 to about 350 m.²/g., precipitating on said core particles a surface film of ferric oxide, separating the resulting particles from the aqueous medium, and thereafter heating the so separated particles to an elevated temperature in an atmosphere of a reducing gas to convert said surface film of ferric oxide on said particles to metallic iron.

8. The method according to claim 7 in which said core particles comprise beneficiated hectorite.

9. The method according to claim 7 in which said core particles comprise activated Attapulgus clay.

References Cited in the file of this patent

UNITED STATES PATENTS

| | | |
|---|---|---|
| 2,497,268 | Neel | Feb. 14, 1950 |
| 2,967,794 | Coxe | Jan. 10, 1961 |